United States Patent
Nelson

(10) Patent No.: US 7,030,759 B2
(45) Date of Patent: Apr. 18, 2006

(54) STEERABLE THREE-DIMENSIONAL MAGNETIC FIELD SENSOR SYSTEM FOR DETECTION AND CLASSIFICATION OF METAL TARGETS

(75) Inventor: Carl V. Nelson, Rockville, MD (US)

(73) Assignee: The Johns Hopkins University, Baltimore, MD (US)

( * ) Notice: Subject to any disclaimer, the term of this patent is extended or adjusted under 35 U.S.C. 154(b) by 84 days.

(21) Appl. No.: 10/182,519

(22) PCT Filed: Apr. 30, 2001

(86) PCT No.: PCT/US01/13933

§ 371 (c)(1),
(2), (4) Date: Jul. 30, 2002

(87) PCT Pub. No.: WO01/84188

PCT Pub. Date: Nov. 8, 2001

(65) Prior Publication Data

US 2003/0016131 A1    Jan. 23, 2003

Related U.S. Application Data

(60) Provisional application No. 60/201,020, filed on May 2, 2000.

(51) Int. Cl.
    *G08B 13/14*    (2006.01)
(52) U.S. Cl. ............... 340/551; 340/568.1; 340/572.7; 340/686.6
(58) Field of Classification Search ............... 340/551, 340/568.1, 686.6, 572.7; 324/243; 342/147; 343/788
See application file for complete search history.

(56) References Cited

U.S. PATENT DOCUMENTS 4,112,349 A    9/1978   Weber (Continued)

FOREIGN PATENT DOCUMENTS

WO    WO 98/30921    * 7/1998 ................. 340/551

OTHER PUBLICATIONS

Cai, Xiaoding: "Uniform Magnetic Field Generated by Two Orthogonal Sheet Current Loops" IEEE Transactions on Electromagnetic Compatibility. vol. 31, No. 3, Aug. 1989, pp. 209–217.

*Primary Examiner*—Anh V. La
(74) *Attorney, Agent, or Firm*—Francis A. Cooch

(57) ABSTRACT

A steerable electromagnetic induction (EMI) sensor system for measuring the magnetic polarizability tensor of a metal target. Instead of creating a vertical magnetic field from a horizontal loop transmitter configuration used by most prior art EMI metal detectors, the transmitter geometry of the sensor system's antenna is designed especially for creating multiple horizontal and vertical magnetic fields and for steering the same in all directions. The horizontal magnetic field (HMF) antenna has the potential advantage of a relatively uniform magnetic field over a large volume. A second potential advantage of the HMF antenna is that compared to a conventional loop antenna, the magnetic field intensity falls off slowly with distance from the plane of the antenna. Combining two HMF sensor systems creates a steerable two-dimensional magnetic field sensor. Combining the steerable HMF sensor with a vertical magnetic field antenna forms a three-dimensional steerable magnetic field sensor system.

30 Claims, 12 Drawing Sheets

U.S. PATENT DOCUMENTS

| | | | |
|---|---|---|---|
| 4,872,018 A * | 10/1989 | Feltz et al. | 343/742 |
| 5,307,072 A * | 4/1994 | Jones, Jr. | 342/147 |
| 5,726,628 A * | 3/1998 | Yoo | 340/551 |
| 6,195,009 B1 * | 2/2001 | Irizarry et al. | 340/573.4 |
| 6,392,547 B1 * | 5/2002 | Stewart et al. | 340/573.1 |
| 6,538,617 B1 * | 3/2003 | Rochelle | 343/788 |
| 6,541,966 B1 * | 4/2003 | Keene | 324/243 |

* cited by examiner

Bx as a function of x at center of antenna.

Plot of Bx angle as a function of x for different heights, z = 20 cm, 30 cm, and 50 cm, above the plane of the antenna.

HMF and loop antenna comparison, log-linear plot of Bx, Bz versus distance, normalized at 10 cm.

3-D sectional plot of Bx using Vector Fields magnetic simulation program.

Conceptual view of magnetic field surrounding a loop antenna.

Conceptual view of magnetic field surrounding an HMF antenna.

Time decay response from #22 AWG calibration loop at different axis angles.

Time decay response of Al soda can and Val59 AP mine normalized at 15 ms.

STEERABLE THREE-DIMENSIONAL MAGNETIC FIELD SENSOR SYSTEM FOR DETECTION AND CLASSIFICATION OF METAL TARGETS

This application claims the benefit of Provisional Application No. 60/201,020, filed May 2, 2000.

BACKGROUND OF THE INVENTION

1. Field of the Invention

The present invention relates to detecting and identifying metal targets in general and, more particularly, to a steerable three-dimensional magnetic field sensor system and method for detecting and identifying metal targets, such as unexploded ordnance (UXO), underground utilities, high metal content landmines and low metal content landmines buried in the soil (or visually obscured) based on the electromagnetic response of the target to a time-domain wide bandwidth electromagnetic spectrum.

2. Description of the Related Art

Most electromagnetic induction (EMI) metal detectors use a loop antenna to create a magnetic field in the vicinity of a metal target for the purposes of detection and identification. One of the most important functions of a magnetic field antenna is to project a strong magnetic field at the site of the target.

Typical loop antennas are formed of multiple turns of wire around a central axis. The magnetic field strength of a loop antenna is a strong function of distance from the antenna. Far from the antenna, along the axis of the loop antenna, the field strength varies approximately as $1/r^3$, where r is the distance from the plane of the loop to the object. Off-axis, the antenna field strength and direction tends to be a very complex function of position, with the field intensity very strong near the wires in the loop and weaker near the center of the loop.

One of the consequences of the loop antenna's complex spatial field strength is the fact that a metal target is excited with a complex magnetic field. When a buried target of unknown depth is scanned with an EMI sensor, the spatial distribution of the excitation field at the target is not known. Some target identification algorithms assume that the target is excited with a uniform field. If the field is in fact complex, the target's time or frequency response to the field is not well characterized. This may tend to complicate or confound a target identification algorithm.

In addition, with the target at the center of the loop, the loop magnetic field antenna only measures the vertical component of a target's decay response.

A metal target can be modeled by defining a magnetic polarizability tensor:

$$\overline{M} = \begin{pmatrix} M_x(t) & 0 & 0 \\ 0 & M_y(t) & 0 \\ 0 & 0 & M_z(t) \end{pmatrix}$$

where the diagonal components of the tensor are the time responses of the target to excitations in an orthogonal reference frame centered on the target. Models of this nature generally assume that the excitation field strength is uniform over the target's volume. For a loop antenna oriented directly over a target, the antenna only excites the vertical component of the target's time decay response, $M_z(t)$. For accurate target classification, it is necessary to measure all three components of a target's magnetic polarizability tensor.

Accordingly, a need exists to develop a magnetic field sensor system that can project a strong magnetic field deeply into the ground; excite the target with a uniform magnetic field; and measure the three-dimensional components of the target's magnetic polarizability tensor. As noted above, prior art EMI metal detectors that use loop magnetic field antennas do not address all of these issues.

SUMMARY OF THE INVENTION

The present invention provides a steerable three-dimensional (3-D) magnetic field sensor system for detection and classification of hidden or obscured metal targets, as well as voids in soil. The steerable 3-D magnetic field sensor system measures the horizontal and vertical components of a metal target's eddy current time decay signature. Instead of creating a vertical magnetic field from a horizontal loop transmitter configuration used by most prior art EMI metal detectors, the transmitter geometry of the sensor system's antenna is designed for creating horizontal and vertical magnetic fields and for steering the same. Two horizontal magnetic field (HMF) antennas and a vertical loop electromagnetic field antenna are combined to form the steerable 3-D magnetic field sensor system.

One of the potential advantages of the steerable 3-D magnetic field sensor system is the relatively uniform magnetic field that is created over a large volume by the HMF antennas. A second potential advantage of the EMI sensor system is that compared to a conventional loop antenna, the magnetic field intensity falls off slowly with distance from the plane of the antenna. These two advantages potentially make the steerable 3-D magnetic field sensor system well suited for detection and classification of metal targets buried deeply in the ground (e.g., landmines, unexploded ordnance (UXO) and underground utilities).

DESCRIPTION OF THE PREFERRED EMBODIMENTS

A discussion is first made as to the underlying physics utilized by a horizontal magnetic field (HMF) sensor system of the present invention. Following this discussion, a description is provided of the steerable two-dimensional HMF sensor system followed by a discussion of experimental data demonstrating the sensor system's capabilities. Following this discussion, a description is provided of the steerable 3-D magnetic field sensor system which includes two HMF antennas and a vertical loop electromagnetic antenna.

I. HMF Antenna Model

The innovative invention of the HMF antenna has not been previously discussed as has the vertical magnetic field antenna. As such, it is instructive to review the basic physics of the innovative HMF antenna so that the advantages of such a magnetic field antenna and magnetic field receivers can be appreciated.

Reviewing a basic physics textbook, one of the first geometries a student is asked to solve is the "sheet current" problem. The textbook problem and its solution very clearly describes the present antenna's configuration. The problem: "Long, straight conductors with square cross-section and each carrying current I are laid side by side to form an infinite current sheet. The conductors lie in the xy-plane, are parallel to the y-axis, and carry current in the +y direction. There are n conductors per meter of length measured long the x-axis." For an infinite conducting sheet, the field is in the x direction and there is no magnetic field variation in the z direction; the field is constant and is given by:

$$B = \mu_0 n\, I/2 \tag{1}$$

where I is the current in the wire and n is the number of wires per meter of length measured along the x-axis.

Expressed another way, the sheet current is a horizontal magnetic field (HMF) generator or antenna. The important feature of Equation (1) is the fact that the magnetic field is constant with z, the distance from the plane of the HMF antenna. Equation (1) forms the basis of the present magnetic field antenna. The objective is to create an approximation to an infinite sheet current and the magnetic field will have a relatively uniform shape and a slow magnetic intensity fall-off with distance from the plane of the HMF antenna. Additionally, the unique character of this HMF allows the present invention to use unique magnetic field receiver configurations that enhance the time-domain performance of the sensor system compared to a conventional loop EMI sensor system.

Figure 1:
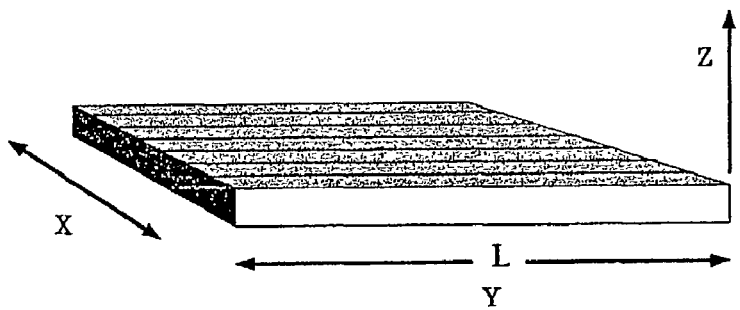
FIG. 1 is a diagram illustrating the antenna geometry of a horizontal magnetic field (HMF) antenna of the steerable electromagnetic induction (EMI) sensor system according to the present invention.

Preliminary HMF antenna modeling uses the simplified geometry of FIG. 1. Using the Biot-Savart Law, the approximate x and z components of the magnetic field can be written as:

$$B_x = \frac{\mu_0 I\, z0}{4\pi} \sum_{n=0}^{N} \left( [z0^2 + (x0 - n\Delta x)^2]^{-1} \left[ \frac{(L - y0)}{\sqrt{(L - y0)^2 + z0^2 + (x0 - n\Delta x)^2}} + \frac{y0}{\sqrt{(y0)^2 + z0^2 + (x0 - n\Delta x)^2}} \right] \right)$$

$$B_z = \frac{\mu_0 I}{4\pi} \sum_{n=0}^{N} \left( (x0 - n\Delta x)[z0^2 + (x0 - n\Delta x)^2]^{-1} \left[ \frac{(L - y0)}{\sqrt{(L - y0)^2 + z0^2 + (x0 - n\Delta x)^2}} + \frac{y0}{\sqrt{(y0)^2 + z0^2 + (x0 - n\Delta x)^2}} \right] \right)$$

(2)

where N is the number of current elements (wires) carrying current I, $\Delta x$ is the wire separation, L is the length of the HMF antenna, and X0, Y0 and Z0 are the location of the magnetic field measurement points in space. For this preliminary modeling effort, the return path of the current is ignored. The current return path is important and when constructing the actual HMF antenna, the return current path can be placed at a relatively large distance to the nominal detection area. The true Bx component of the magnetic field will be slightly distorted from the values generated by the present calculations. The magnetic field distorting caused by the actual return path of the wires can be controlled for the desired field uniformity by moving the wires far from the detection area or by adding magnetic shielding to the return path wires. In any case, the magnetic field distortions are an order of magnitude smaller than the spatial field distortion of a loop antenna. In addition, with the simple geometry of a plane set of wires, there is no By component of the magnetic field.

Calculations using Equation (2) were made with the following antenna parameters: X=100 cm, L=300 cm, N=50 and $\Delta x$=2 cm. These parameters were selected for a conceptual application of a HMF sensor mounted on a UXO survey cart similar to the United States Navy's Multi-sensor Towed Away Detection System (MTADS). MTADS uses three EM metal detectors, with 1 m diameter loop antennas to cover a 3 meter wide search area. The MTADS is designed to search and identify buried UXO.

Figure 2:
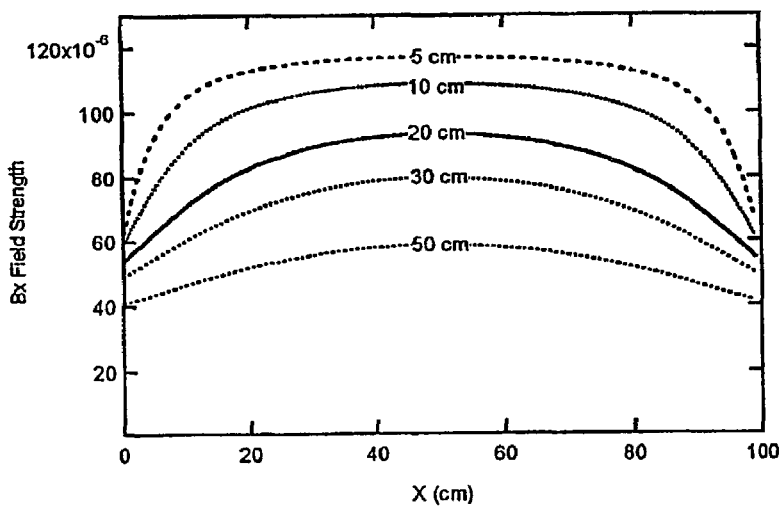
FIG. 2 is a chart showing Bx as a function of x at the center of the HMF antenna for different distances from the plane of the HMF antenna in the z direction.

FIG. 2 is a plot of Bx versus x at the center of the HMF antenna (y=150 cm) for different distances from the plane of the HMF antenna in the z direction. Note that the field intensity is relatively uniform except close to the edge of the HMF antenna. For a particular application depth, the HMF antenna parameters can be adjusted for the desired Bx field uniformity.

Figure 3:
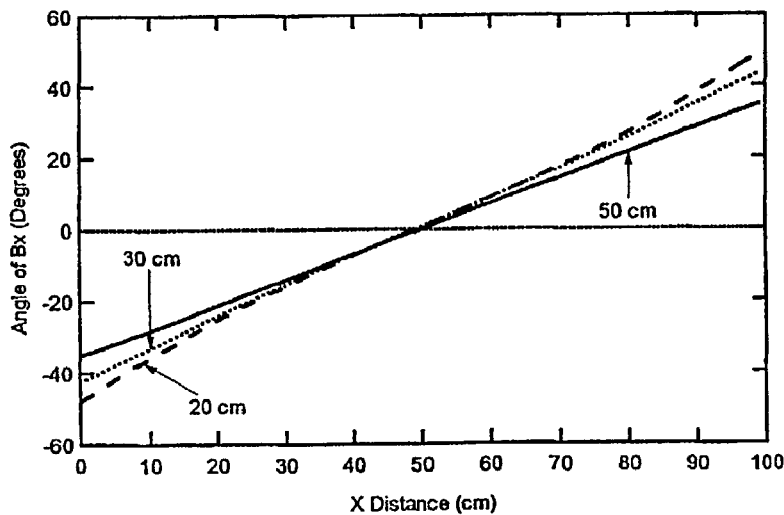
FIG. 3 is a chart showing the angle of Bx as a function of x for different heights above the plane of the HMF antenna.

FIG. 3 shows the angle of Bx as a function of x (cross antenna track). It is noted that if a receiver coil is placed at the center of the HMF antenna in the plane of the HMF antenna, there is no net flux through the receiver coil. The Bz components of the magnetic field cancel. This implies that a horizontal receiver coil so placed will, to first order, not "see" the turn-off transients of a pulsed time-domain version of the sensor. This also implies that a HMF antenna could potentially be used in a frequency domain sensor system, since the coupling between the transmitter and receiver are minimized.

Figure 4:
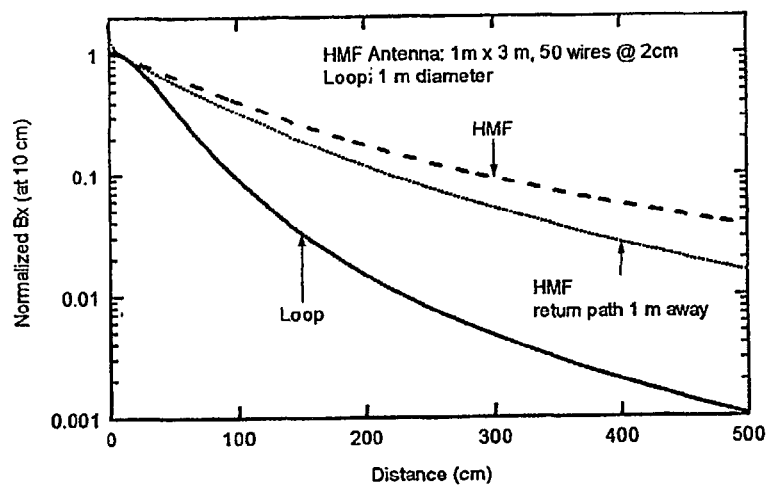
FIG. 4 is a log-linear chart that compares Bx from HMF antenna according to the present invention to Bz of a prior art loop antenna versus distance from the plane of the HMF antenna.

FIG. 4 is a log-linear plot that compares Bx from the HMF antenna (1 m by 3 m) to Bz of a prior art loop antenna (1 m diameter) versus distance from the plane of the HMF antenna of the present invention. The magnetic fields from each antenna have been normalized to 1 at a depth of 10 cm to show the relative field intensity fall-off with distance. The calculations were made along the centerline of each antenna.

Over the depth range of 10 cm to 500 cm, FIG. 4 shows that the HMF antenna field strength varies by approximately a factor of 30, while over the same distance range, the loop antenna varies by a factor of 1000. Also shown in FIG. 4 is a third curve of a HMF antenna with a return current path 1 m away from the primary antenna surface. The Bx field strength is lower than the HMF field without the return path, but the field still falls off more slowly than the loop antenna. Over the distance range of 10 cm to 500 cm, the HMF antenna field strength with a return path included varies by approximately a factor of 60. This is still much less than the prior art loop antenna value of 1000. Increasing the return path separation distance or using some form of magnetic shielding will reduce the return path effect even more.

Figure 5:
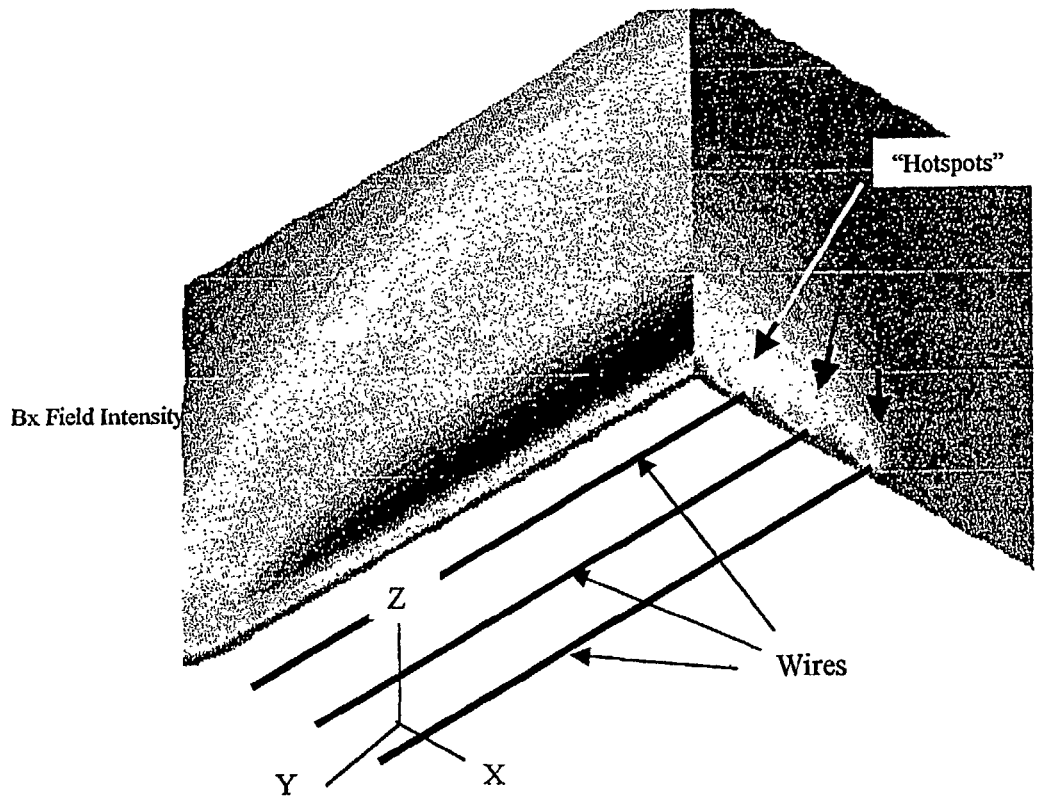
FIG. 5 illustrates a three-dimensional plot of Bx surrounding the HMF antenna of the present invention.

FIG. 5 shows a three-dimensional (3-D) plot of Bx surrounding the HMF antenna. Note that the field in both the x and y directions is relatively uniform, except near the current carrying wires and edges of the HMF antenna. As one would expect, the field near the wires is very intense, causing local "hot spots."

Figure 6A:
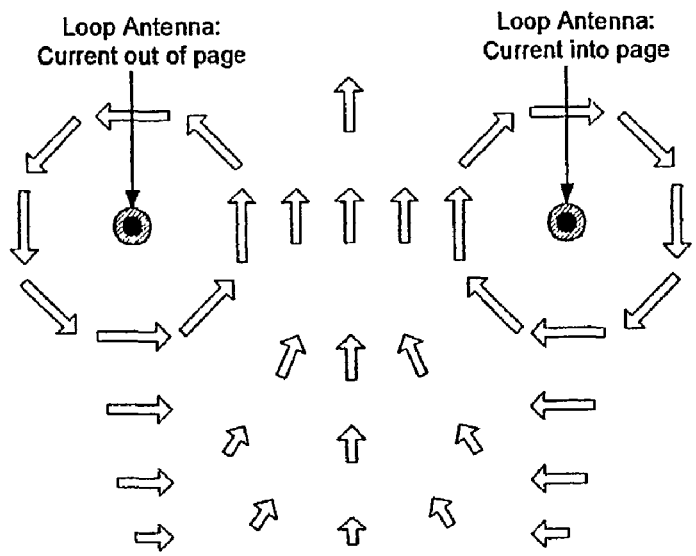
FIGS. 6A and 6B illustrate the field distribution from the prior art loop antenna and the HMF antenna of the present invention, respectively.
Figure 6B:
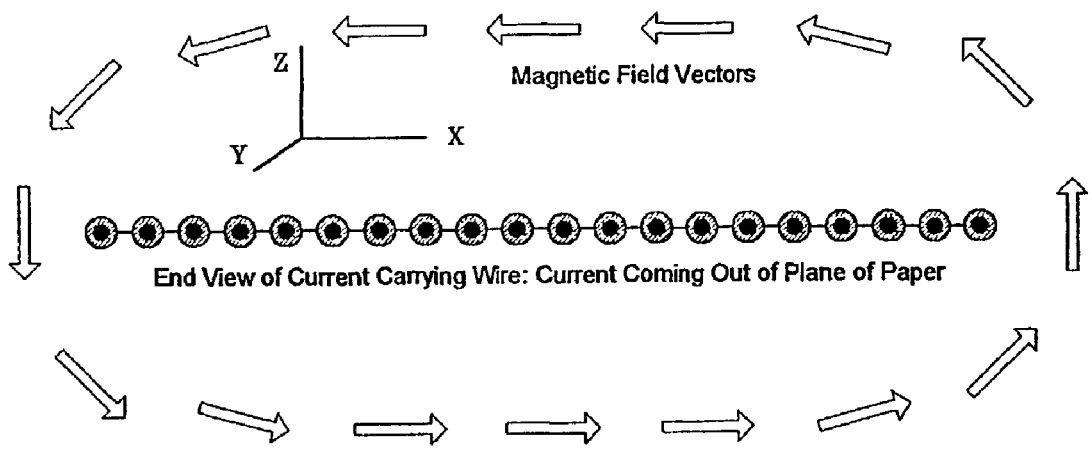

Another way to view the field distribution from the loop and HMF antennas is shown in FIGS. 6A and 6B. Here, we have a simplified conceptual diagram of the magnetic field vectors from the different antennas. FIG. 6A shows the magnetic field surrounding a simple loop antenna looking from the side. The field is relatively uniform in the center of the antenna and is oriented in the vertical direction. As we move away from the plane of the loop in the −z direction, the field continues to be vertical along the axis, but off-axis the field has a more complex shape. The field is approximately horizontal under the loop conductors.

FIG. 6B shows the magnetic field surrounding the HMF antenna looking down the current carrying wires. The current carrying wires are perpendicular to the plane of the paper and the current direction is out of the paper. In the region near the center of the HMF antenna, the magnetic field is in the horizontal direction. As one moves from the center of the HMF antenna, the field becomes more complex, with Bz starting to dominate at the edge. However, as FIGS. 2 and 5 show, the field remains relatively uniform in the x direction.

II. Sensor System Description

The steerable 3-D magnetic field sensor system is composed of three subsystem components: (1) two identical time-domain HMF electromagnetic sensor subsystems, each producing a HMF at right angles to each other; and (2) a conventional horizontal loop antenna magnetic field sensor system that produces a vertical magnetic field. Each HMF subsystem in turn is composed of two basic components: (1) the HMF antenna and (2) the magnetic field receiver.

A magnetic field is a vector quantity. It has magnitude and direction and can be decomposed into individual components in an orthogonal coordinate system. For example, in a Cartesian coordinate system of X, Y and Z, a magnetic field vector can be represented by Bx, By and Bz. If we generate in the same volume (spatial region) a magnetic field in the X direction, Bx; generate a magnetic field in the Y direction, By; and generate a magnetic field in the Z direction, Bz, the individual magnetic field components combine to form a new magnetic field that has a magnitude and direction given by:

$$|\vec{B}| = \sqrt{B_x^2 + B_y^2 + B_Z^2}$$

$$\theta = \tan^{-1}\left[\frac{B_y}{B_X}\right]$$

$$\delta = \tan^{-1}\left[\frac{B_z}{\sqrt{B_x^2 + B_y^2}}\right]$$

where $\theta$ is the angle measured from the x axis in the XY plane and $\delta$ is the angle from the XY plane to the B vector.

By varying the magnitude of the three magnetic field components, a magnetic field can be projected in any direction. A X direction magnetic field is generated by a X directed HMF antenna, a Y direction magnetic field is generated by a Y directed HMF antenna, and a Z direction magnetic field is generated by a Z directed horizontal loop antenna. Combining all three antennas, a 3-D magnetic field sensor system of the present invention is created.

The details of the HMF subsystem is described first. Later, the use of two HMF subsystems and the vertical magnetic field sensor (horizontal loop) will be described that show the creation of the steerable 3-D magnetic field sensor system.

Figure 7:
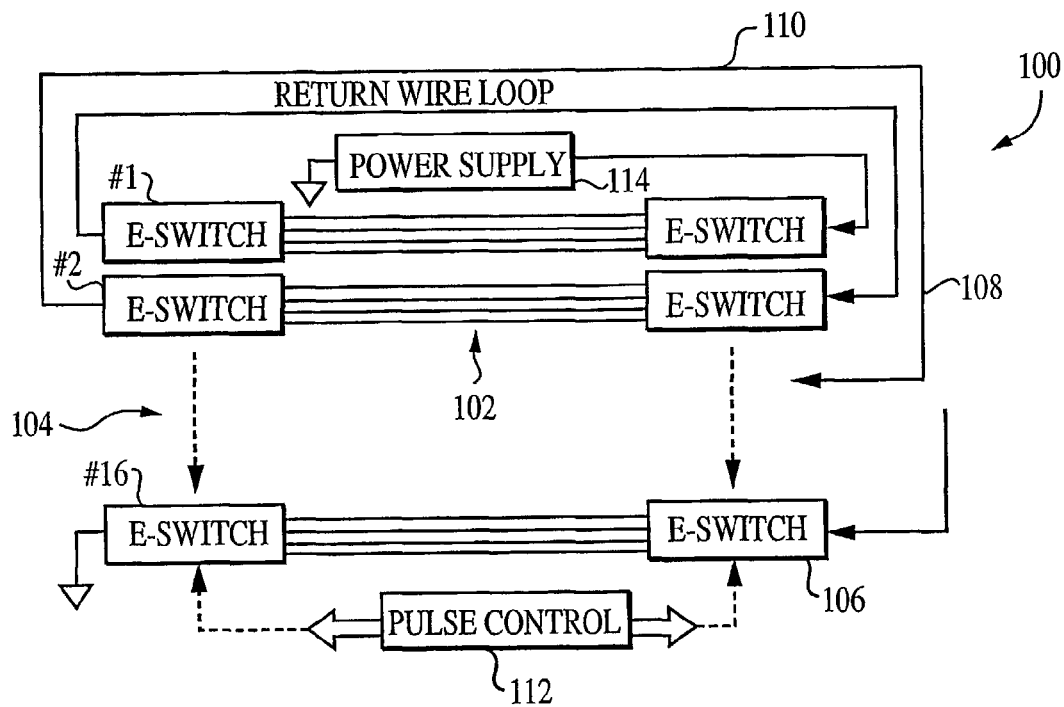
FIG. 7 is a block diagram of the HMF antenna according to the present invention.

FIG. 7 is a simplified block diagram of the HMF sensor system designated by reference numeral 100 according to the present invention. An approximation to a sheet current is created by a series of closely spaced parallel wires 102. These wires form the active surface of the HMF antenna 104. The closely spaced parallel wires 102 are connected to high-speed electronic switches (E-Switch) 106.

Return current wire segments 108 of wires 102 exit the E-Switches 106 in a direction perpendicular to the plane of the HMF antenna 104. The circuit is completed with a set of parallel return wire segments 110 relatively far away from the active surface of the HMF antenna 104. As noted above, the return wire segments 110 of wires 102 complicate the exact magnetic field geometry of the HMF antenna 104, but close to the center of the active surface of the HMF antenna 104, the horizontal component of the magnetic field dominates the other components.

A preferred embodiment of the sensor system is described. The current in the HMF antenna 104 is controlled by the high speed E-Switches 106 operating in parallel. The E-Switches 106 are electronic relays with very fast turn-off times, preferably constructed using insulated gate, bipolar transistors in a floating configuration. One skilled in the art can construct the E-Switch 106. Opto-isolators are used to couple the E-Switches 106 to the ground-referenced pulse control circuitry 112.

The HMF magnetic field sensor system 100 is preferably configured so that a single power supply 114 provides current to the HMF antenna 104. It is understood that a different power supply arrangement could be used that satisfied specific application requirements. For example, the present embodiment requires a relatively high voltage and high current power supply to drive the chain of E-Switches 106. Multiple lower voltage and/or lower current power supplies could be employed that have the same desired magnetic field characteristics. Also, the power supplies could be configured so that different current is flowing through different portions of the HMF antenna wires. Using different current levels in different parts of the HMF antenna 104 allows one to tailor the spatial character of the magnetic field.

The E-Switches 106 turn-off the antenna current in less than about 400 ns (90% to 10% amplitude). To reduce the number of E-Switches 106, each E-Switch 106 controls four closely spaced parallel wires 102. It is understood that the number of wires controlled by the E-Switches 106 is only limited by the exact electrical characteristics of the E-Switches 106 and the electrical properties of the wires (e.g., resistance, inductance and capacitance). More or less wires could be connected to the E-Switches 106 depending on the application.

Two banks 116 (see FIG. 8) of 16 E-Switches 106 control 64 parallel wires 102 forming the active surface of the HMF antenna 104. The size of the HMF antenna 104 is approximately 80 cm by 180 cm and the parallel wires 102 are spaced about 1.3 cm apart.

Figure 9:
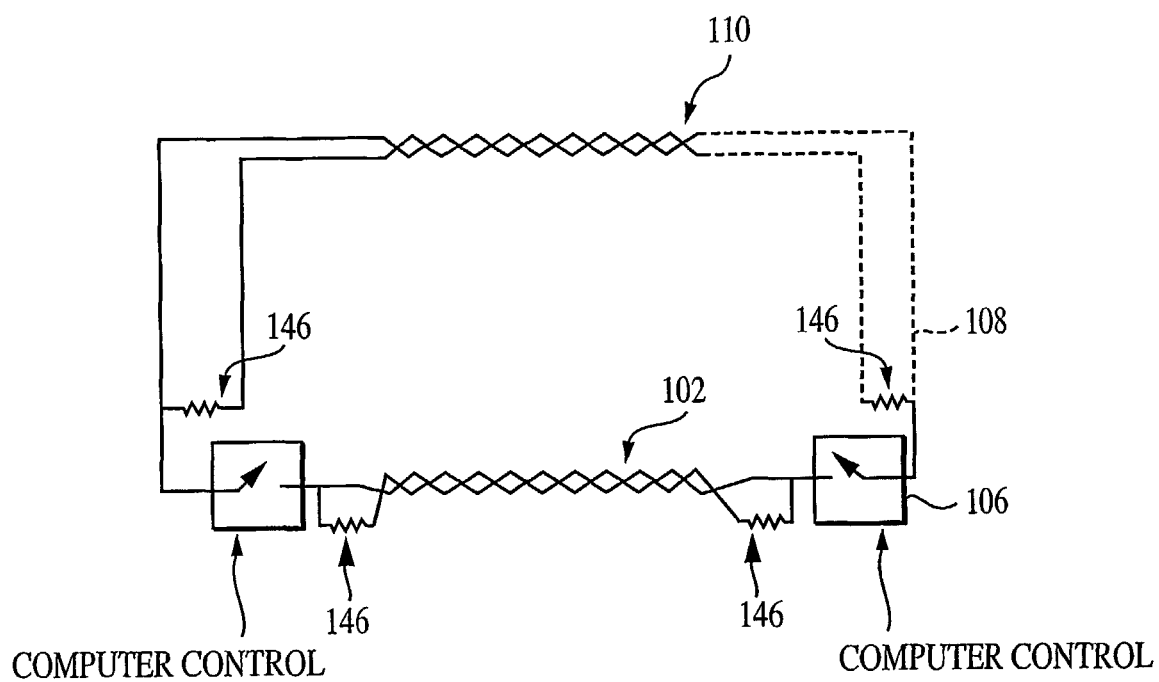
FIG. 9 is a diagram illustrating the HMF antenna having twisted return wires, twisted parallel wires and damping resistors.

FIG. 9 is a diagram illustrating a wiring configuration of the HMF antenna 104 having twisted parallel wires 102, twisted return wires 110 and damping resistors 146. FIG. 9 only shows one twisted parallel wire 102 and one twisted return wire 102 for clarity. It is to be appreciated that all the parallel wires 102 and all return wires 110 are twisted. E-Switches 106 are provided to control the antenna current flow. When the E-Switch 106 goes from a closed position (current flowing in loop) to an open position, a damping resistor 146 placed across the loop dampens the current as quickly as possible without circuit oscillation or a long decay time (critically damped).

The inventive arrangement of wires and damping resistors 146 minimizes circuit oscillation, minimizes the time for current damping and minimizes the magnetic field collapse time. In a time-domain metal detection sensor, the sooner the primary excitation magnetic field disappears, the sooner the small eddy currents from the target can be measured. The decay of the primary magnetic field is governed by the decay of the current in the wire after the switch is opened.

Ignoring capacitive effects, the decay time on the loop is given by L/R, where L is the inductance of the loop and R is the resistance of the loop. Minimizing L and making R as large as possible without causing oscillation minimizes the decay of the current in the loop and therefore, the presence of the primary excitation magnetic field. Breaking the loop up into segments as shown in FIG. 9 reduces the L of the segment. Having a return wire 110 between the two switches 106 allows a damping resistor 146 to be placed across the wire segment, therefore, damping the inductance of that wire segment.

FIG. 9 shows two damping resistors 146. Although not necessary for the operation of the damping function, using two resistors 146 add symmetry to the damping function. In wide-bandwidth circuits, symmetric circuit layouts work more effectively. The HMF antenna arrangement also works with just one E-Switch 106 controlling the section of wires, but less effectively. Additionally, a single resistor could be used for all the wires controlled by the E-Switch 106.

III. Experimental Results

III.1 Experimental Setup

Figure 8:
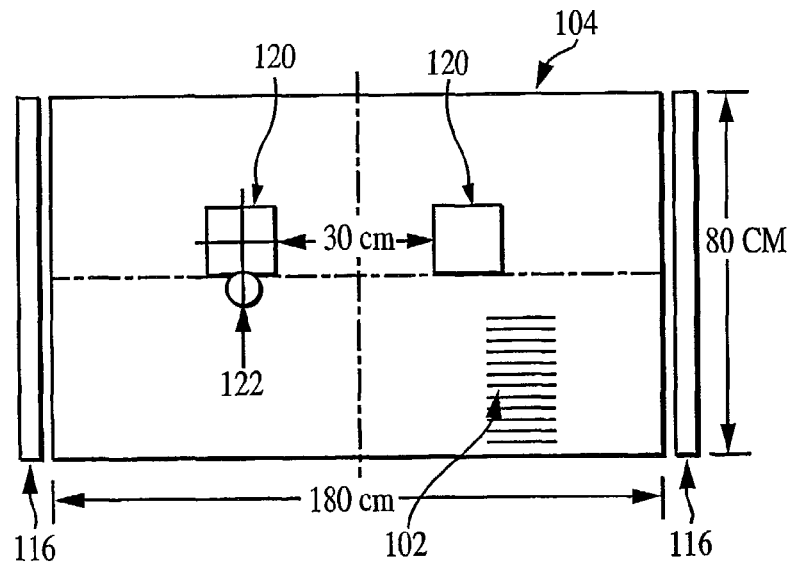
FIG. 8 is a diagram of an experimental setup for performing test target measurements using the HMF antenna of the present invention.

Experiments were conducted to validate the operation of the HMF sensor system. FIG. 8 shows a diagram of the experimental setup (top view) for the test target measurements. Two 15 cm by 15 cm, 16-turn printed circuit board receiver coils 120 were placed near the center of the HMF antenna 104. The receiver coils 120 were connected in a differential arrangement to subtract any residual coupled antenna decay current and far-field electrical noise.

Test targets 122 were placed directly over one edge of the receiver coil 120 as shown in FIG. 8. The receiver signal was amplified by a wide-bandwidth, multi-stage differential amplifier (not shown). The output of the amplifier was digitized with a data acquisition system mounted in a personal computer.

III.2 Target Responses

To validate the sensor system's ability to accurately measure time decay responses from metal targets, the sensor system 100 was tested with a calibration loop. A thin-wire loop can be modeled with a single exponential decay parameter that can be calculated analytically from theory.

A calibration loop was formed from a single turn of #22AWG (American Wire Gage) copper wire with a diameter of 10.1 cm. The loop was placed in three orientations over the sensor system 100: the axis parallel to the plane of the HMF antenna 104 (i.e., maximum coupling to Bx flux) at z=10 cm; the axis 45 degrees to the plane of the HMF antenna 104 with center of loop at z=10 cm; and the axis perpendicular to the plane of the HMF antenna 104 with center of loop at z=10 cm.

Figure 10:
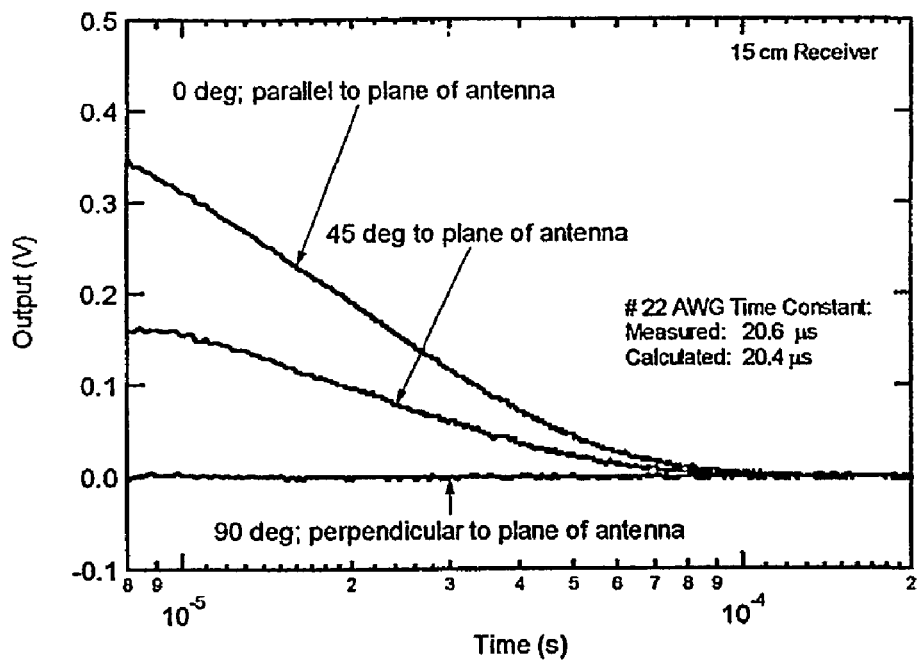
FIG. 10 is a chart showing time decay response data from a calibration test over a time period.

FIG. 10 shows time decay response data from the calibration test over the time period of 8 μs to 200 μs. A nonlinear least-squares method was used to fit the wire loop time decay response data to a single exponential-term equation over the time range of 10 μs to 50 μs. The calculated time decay of the wire loop is 20.4 μs and compares favorably with the measure time decay of 20.6 μs for both the parallel and 45 degree orientations. The results of the time constant calibration gives confidence that the sensor system 100 measures accurate target time decay responses.

FIG. 10 shows three features of the target responses as measured by the sensor system 100:

First, while the amplitude of the time decay response may change due to the different flux coupling between the HMF antenna 104 and receiver unit 120, the time decay does not. The 0° and 45° time decay responses are the same.

Second, when the loop target axis is perpendicular to the HMF antenna 104, the response is approximately zero. When the calibration loop is oriented in this fashion, there is approximately zero flux coupling from the HMF antenna 104 into the loop. Therefore, there is no flux change to excite eddy currents. This result validates the idea that the primary magnetic field component, at this location over the HMF antenna 104, is horizontal.

Third, target time decay response can be measured relatively close to the antenna turn-off time.

Figure 11:
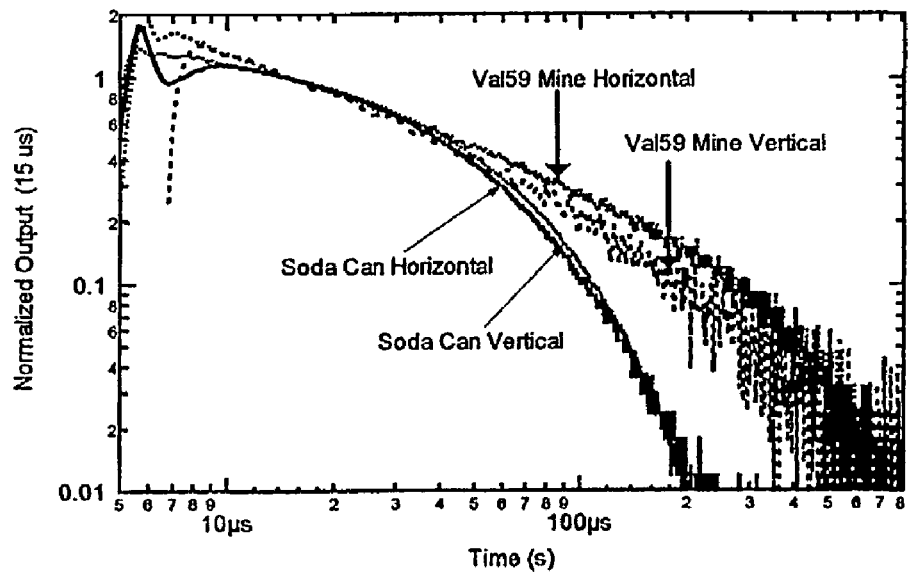
FIG. 11 is a log-log chart of data from an aluminum soda can and a Val 59 metal anti-personnel (AP) mine taken approximately 15 cm above the HMF antenna.

The time decay data in the time region between 0 µs and 8 µs is not shown in FIG. 10, since the receiver unit 120 was either in saturation or was oscillating. FIG. 11 shows some of these sensor artifacts in the time region of 5 µs to 8 µs. It is contemplated to use a higher bandwidth and wider dynamic range magnetic field antenna to measure target time decay closer to the antenna turn off time. This would enable the detection of low metal content targets, since such targets have a fast time decay response. Since the HMF antenna turns off in less than 1 µs, the performance (i.e., increased bandwidth) of the sensor system can be improved by using higher frequency receiver coils or higher bandwidth magnetic sensors.

The primary objective of the HMF sensor system 100 is target identification and classification based on eddy current time decay. With this objective in mind, FIG. 11 presents preliminary time decay response data from two different targets at two different orientations to the HMF antenna plane. The absolute amplitude of the target time decay response does not govern the target characterization process. Therefore, in order to show more clearly the differences in the relative time decay responses of different targets with large differences in absolute amplitude, the time decay data amplitudes have been normalized to 1 at 15 µs. FIG. 11 is a log-log plot of data from an aluminum soda can and a Val 59 metal anti-personnel (AP) mine taken approximately 15 cm above the plane of the HMF antenna 104. The two targets were oriented both vertically and horizontally relative to the plane of the HMF antenna 104. FIG. 11 clearly shows that the two targets can be differentiated from each other based solely on their time decay responses. This target differentiation has been demonstrated in other research and forms the basis of target identification and classification. FIG. 11 demonstrates that the sensor system 100 has the capability to measure target time decay responses that are different for different targets, and for identifying the different targets.

III.3 Operation

A description will now be provided as to the operation of the HMF antenna 104 with different receiver configurations. These receiver configurations can be used singly or in combination. We start with simple configurations that show the underlying concepts of the HMF sensor system features and move to more complex receiver configurations that take full advantage of the HMF antenna characteristics.

Figure 12A:
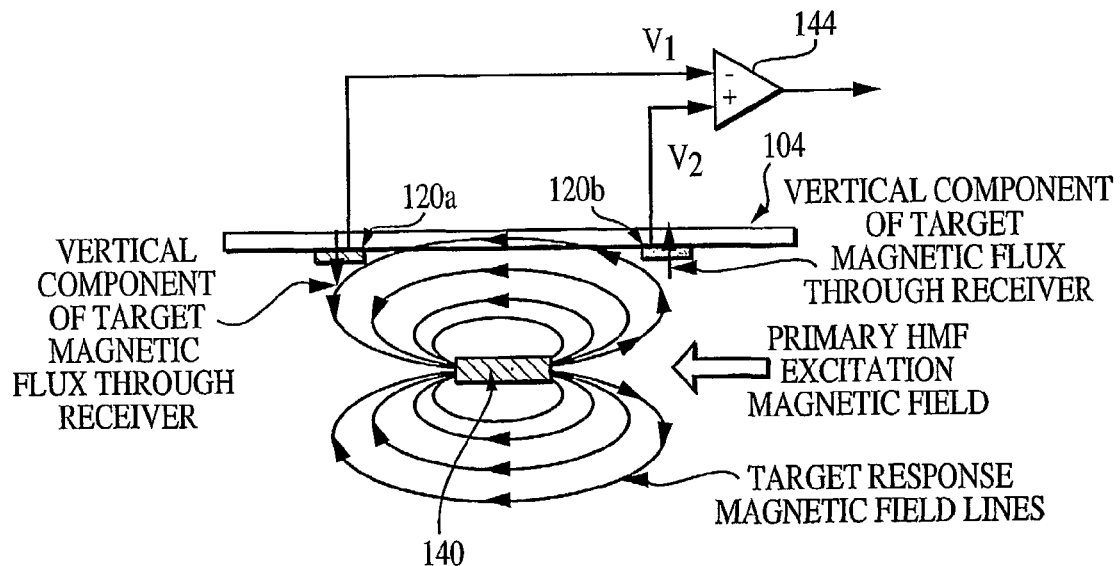
FIG. 12A is a diagram illustrating operation of the HMF antenna where receiver units are vertically oriented.
Figure 12B:
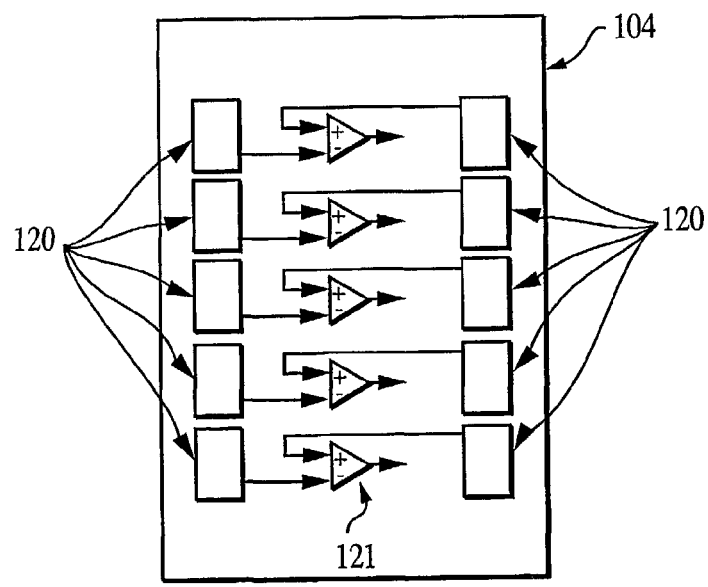
FIG. 12B is a diagram illustrating a vertical receiver array configuration for the receiver units of FIG. 12A.

FIG. 12A is a side view diagram illustrating operation of the HMF antenna 104 where the receiver units 120a, 120b are vertically oriented. FIG. 9B is a top view diagram illustrating a vertical receiver array configuration for the receiver units 120a, 120b of FIG. 9A. Vertically oriented receivers refers to the axis of sensitivity of the receiver, i.e., the receiver is sensitive to vertical magnetic fields. The receiver units 120 are located near the opposite edges of the HMF antenna 104 above the plane of the HMF antenna 104 (toward the direction of the metal target 140) and are connected to differential amplifier 121. Even though the receiver units 120 are illustrated as using an induction coil, it is contemplated that the receiver units 120 can use other types of magnetic sensors.

FIG. 12A shows the metal target 140 located near the centerline of the HMF antenna 104 at some distance from the plane of the HMF antenna 104. The HMF antenna 104 generates a magnetic field in the positive x-direction as indicated by the HMF excitation arrow pointing to the right. When the magnetic field is turned off, the metal target 140 responds by generating a magnetic field that opposes the collapsing magnetic field, i.e., eddy currents in the metal target 140 are generated. FIG. 12A shows conceptually the magnetic field (target response) generated by the metal target's eddy currents. At the left receiver unit 120a, the magnetic flux from the target response is downward in the −z direction, (−Bz). The vertical (z sensitive) magnetic field receiver unit 120a detects this magnetic flux and sends the signal VI to a differential amplifier's negative input. The differential amplifier is designated by reference numeral 144.

At the same time, the right receiver unit 120b intercepts the magnetic flux from the target response which is upward, +z direction, (+Bz). The nominally identical right vertical magnetic field receiver unit 120b detects this magnetic flux and sends the signal $V_2$ to the differential amplifier's positive input. The output from the differential amplifier 144 can be written as:

$$V = V_2 - V_1 + N_2 - N_1$$

where $V_1$ is the left receiver unit signal, $V_2$ is the right receiver unit signal, $N_1$ is the electromagnetic (EM) noise (e.g., interference) measured by the left receiver unit 120a and $N_2$ is the EM noise measured by the right receiver unit 120b. Since the EM noise seen by both receiver units 120a, 120b is nominally the same and $V_1 \approx -V_2$, the output of the differential amplifier 144 is then, $$V = 2 * V_2$$

The EM noise terms cancel and we double our target signal. The amplification of the target signal is dependent on the spatial relationship between the target 140 and the sensor system 100. However, the EM noise cancellation is still effective and allows the sensor system 100 to operate in EM noisy environments.

It is also obvious that the receiver units 120 could be wired together directly to create the same effect as that generated by the differential amplifier 144. This alternate connection of the receiver units 120 is understood in the following discussion. The use of the differential amplifier 144 makes the discussion of signal addition and subtraction clear.

Figure 13A:
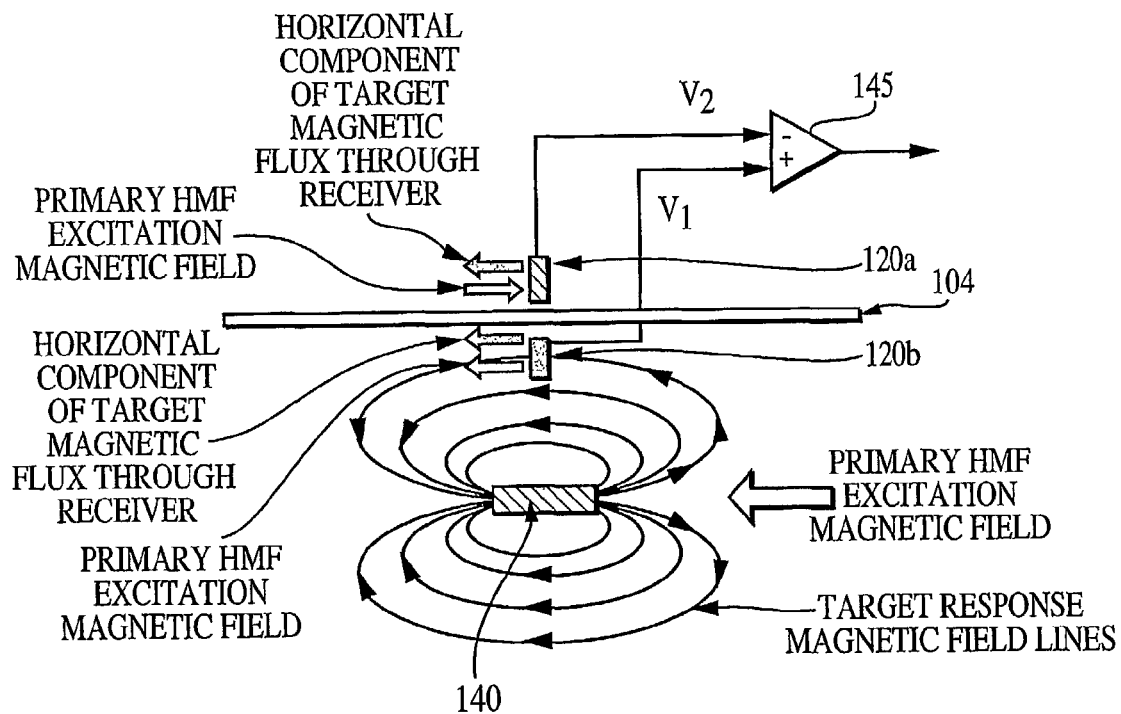
FIG. 13A is a diagram illustrating operation of the HMF antenna where receiver units are horizontally oriented.
Figure 13B:
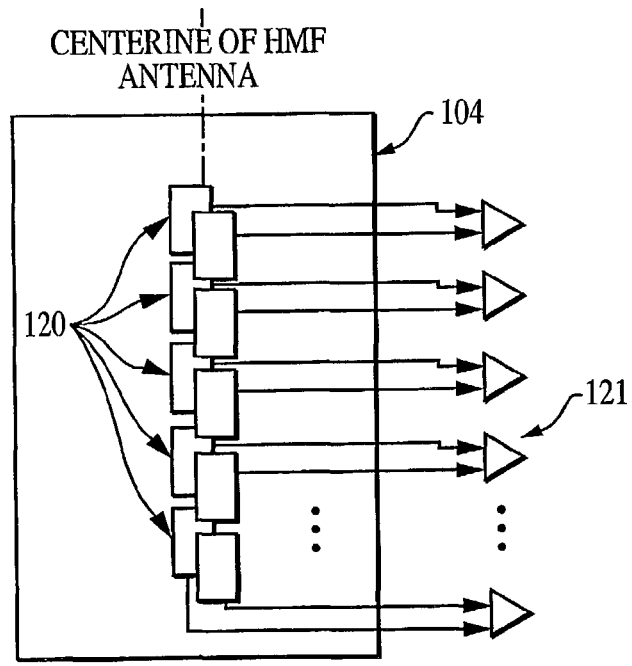
FIG. 13B is a diagram illustrating a horizontal receiver array configuration for the receiver units of FIG. 13A.

FIG. 13A is a side view diagram illustrating operation of the HMF antenna where the receiver units 120a, 120b are horizontally oriented. FIG. 13B is a top view diagram illustrating a horizontal receiver array configuration for the receiver units 120a, 120b of FIG. 13A. Referring back to FIG. 13A, the receiver units 120a, 120b are nominally located along the centerline of the HMF antenna 104. When the target 140 is located directly under the plane of the HMF antenna 104, the target flux is primarily horizontal at the plane of the antenna 104. The horizontal receiver units 120a, 120b detect this flux.

FIG. 13A shows the HMF antenna 104 generating a magnetic field in the negative x-direction as indicated by the HMF excitation arrow pointing to the left. When the magnetic field is turned off, the metal target 140 responds by generating a magnetic field that opposes the collapsing magnetic field, i.e., eddy currents in the metal target 140. FIG. 13A shows conceptually the magnetic field (target response) generated by the metal target's eddy currents. The target response flux at the plane of the HMF antenna 104 is pointing to the left as denoted by the small arrows. The signals from the two receivers units 120a, 120b are preferably summed in an amplifier 145. The signal measured by the receiver units 120a, 120b can be written as:

Signal Output=$R1(T)+R1(N)+R1(A)+R2(T)+R2(N)+R2(A)$.

R1 is the top receiver unit 120a and R2 is the bottom receiver unit 120b, R1(T) is the top receiver unit's target signal, R1 (N) is the top receiver unit's EM noise signal, R1(A) is the top receiver unit's antenna signal, R2(T) is the bottom receiver unit's target signal, R2(N) is the bottom receiver unit's EM noise signal and R2(A) is the bottom receiver unit's antenna signal. If the two receiver units 120a, 120b are placed symmetrically on the antenna 104, then R1(A)=−R2(A) and the antenna signals cancel when added together by the summing amplifier 145. One is then left with approximately twice the target signal and twice the EM noise signal.

Figure 14:
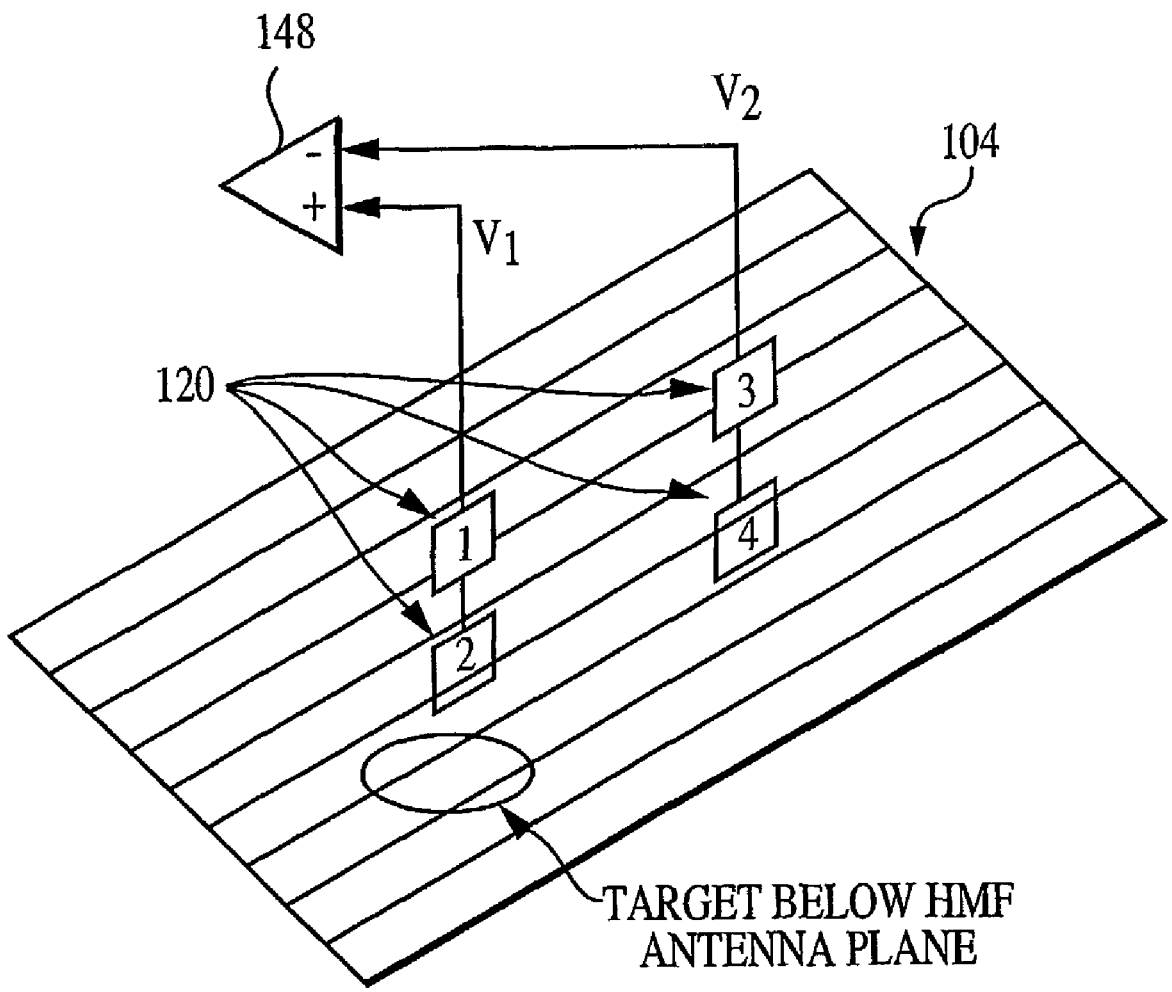
FIG. 14 is a diagram illustrating the horizontal receiver array configuration, the HMF antenna and a differential amplifier.
Figure 15A:
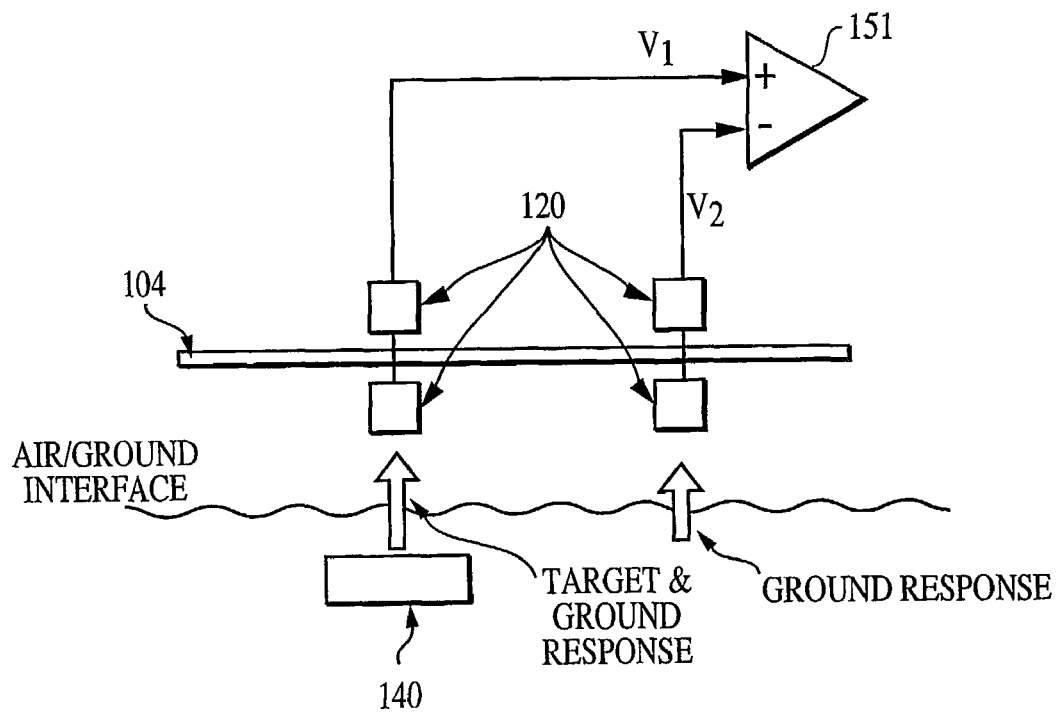
FIG. 15A is a diagram illustrating detection of a metal target using the HMF antenna and the horizontal receiver array configuration.
Figure 15B:
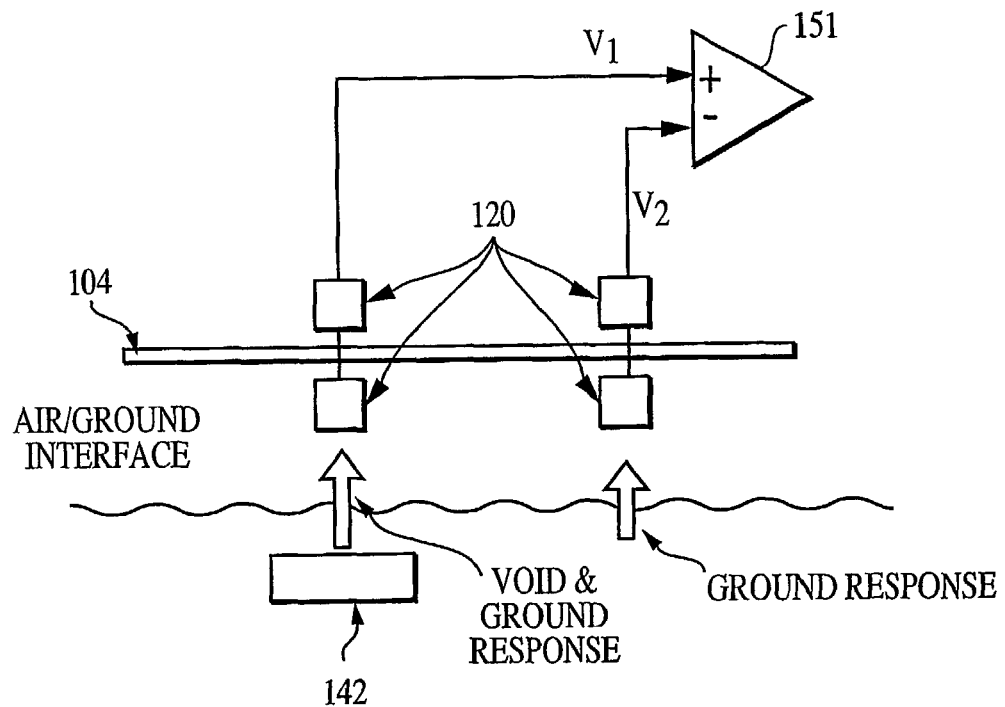
FIG. 15B is a diagram illustrating detection of an underground void using the HMF antenna and the horizontal receiver array configuration.

FIGS. 14–15B illustrate how to reconfigure the receiver units 120a, 120b in FIG. 13A for both antenna flux cancellation and additionally, flux cancellation from EM noise and the eddy currents generated in the ground (ground response). The feature of ground eddy current cancellation is called ground-balancing and is an important concept for low-metal target and underground void detection.

FIG. 14 is a diagram illustrating the horizontal receiver array configuration having the horizontal receiver units 120 mounted in a differential mode. Receiver unit 1 is mounted on the top side of the HMF antenna 104 and receiver unit 2 is mounted on the bottom side of the HMF antenna 104 as in FIG. 13A. The signals of the two receiver units 1, 2 are summed together and the output is sent to the plus input of differential amplifier 148. Additionally, a second set of identical receiver units 3, 4 are located near the first set, but not directly over the target under study. Their summed output is sent to the negative input of the differential amplifier 148. Using similar notation as above, the output signal of the differential amplifier 148 can be written as:

$A=R1(T)+R1(N)+R1(A)+R1(G)+R2(T)+R2(N)+R2(A)+R2(G)$ $B=R3(N)+R3(A)+R3(G)+R4(N)+R4(A)+R4(G).$

Where R1 and R3 are the two top receiver units 1, 2 and R2 and R4 are the two bottom receiver units 3, 4; R1(T), R1(N), R1(A), and R1(G) are the first receiver unit's target, EM noise, antenna and ground signals, respectively; R2(T), R2(N), R2(A), and R2(G) are the second receiver unit's target, EM noise, antenna, and ground signals, respectively; R3(N), R3(A), and R3(G) are the third receiver unit's EM noise, antenna, and ground signals, respectively; and R4(N), R4(A), and R4(G) are the fourth receiver unit's EM noise, antenna, and ground signals, respectively.

If the top two pairs of receiver units 1, 2 are placed symmetrically on the antenna 104, then:

$R1(T)\approx R2(T)$ $R1(A)=R3(A)=-R2(A)=-R4(A)$ $R1(N)=R3(N)=R2(N)=R4(N).$

The differential amplifier 148 (or alternatively, differencing via direct connection with wires in reverse order as in the case of counter-wound induction coil receivers) subtracts B from A and:

Output=$A-B$

Output=$2*R1(T)+R1(G)+R2(G)-R3(G)-R4(G).$

FIG. 15A shows the case of a medium or large metal target 140 that has a response that is larger than the ground response. The relative size of the arrows in FIG. 15A indicate the relative response's from the metal and ground. Then, Output=$2*R1(T)R(G)<<R(T).$ Hence, the medium or large metal target 140 is detected by the system 100 and/or an operator.

For the case of a small metal target where the metal response is not large with respect to the ground, then, $R1(G)\approx R3(G)$ $R2(G)\approx R4(G)$ Output$\approx 2*R1(T).$ The case of an underground void is shown by FIG. 15B, where the underground void is designated generally by reference numeral 142. The ground response of the underground void 142 is less than the ground response without the underground void 142. When the signals are subtracted in differential amplifier 151, the void signal is negative. Accordingly, the system 100 and/or the operator detect the existence of the underground void 142.

If there is an underground void 142 and a small metal content target present, as is the case for a low-metal content mine, the time decay signal will be composed of both negative (void) and positive (metal) signals. The eddy current time decay of a void and metal target are very different. Accurately measuring the time decay history of the target response allows one to separate the void and metal signals. The existence of a coincident metal and void signal is an indication of a low-metal content mine.

IV. Forming the Steerable 3-D Magnetic Field Sensor System

One method to model a metal target is to define a magnetic polarizability tensor $$\vec{M} = \begin{pmatrix} M_x(t) & 0 & 0 \\ 0 & M_y(t) & 0 \\ 0 & 0 & M_z(t) \end{pmatrix}. \tag{3}$$

where the diagonal components of the tensor are the time responses of the target to excitations in an orthogonal reference frame centered on the target. For a loop antenna oriented directly over a target, the antenna only excites the vertical component of the target's time decay response. For accurate target classification, it is desirable to measure all three components of a target's magnetic polarizability tensor. Accordingly, a discussion will now be presented for combining two single HMF sensor systems 100 to form a steerable two-dimensional (2-D) HMF sensor system and then combining a steerable 2-D HMF sensor system with a vertical loop antenna sensor system and forming the steerable 3-D magnetic field sensor system.

Figure 16:
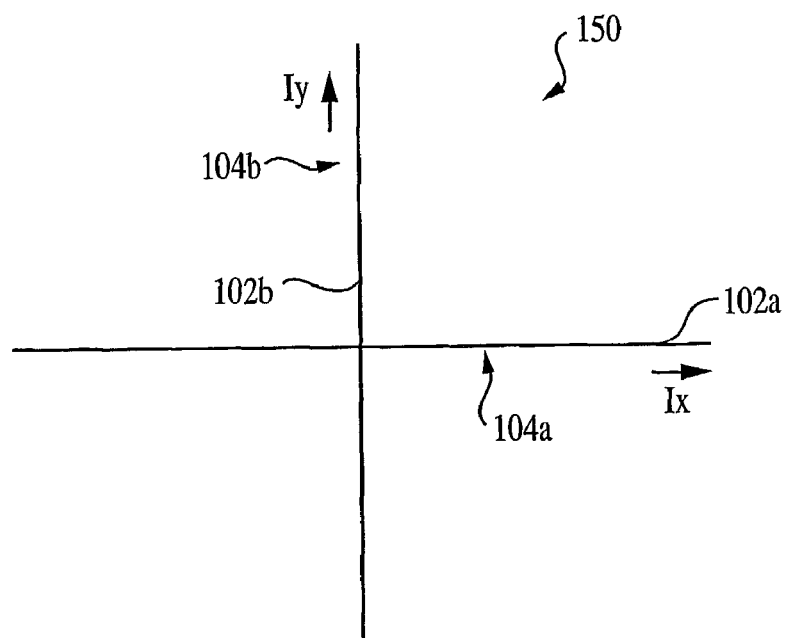
FIG. 16 is a diagram illustrating two HMF antennas at right angles to each other forming a two-dimensional HMF antenna that can generate a horizontal magnetic field which can be steered in any direction.
Figure 17:
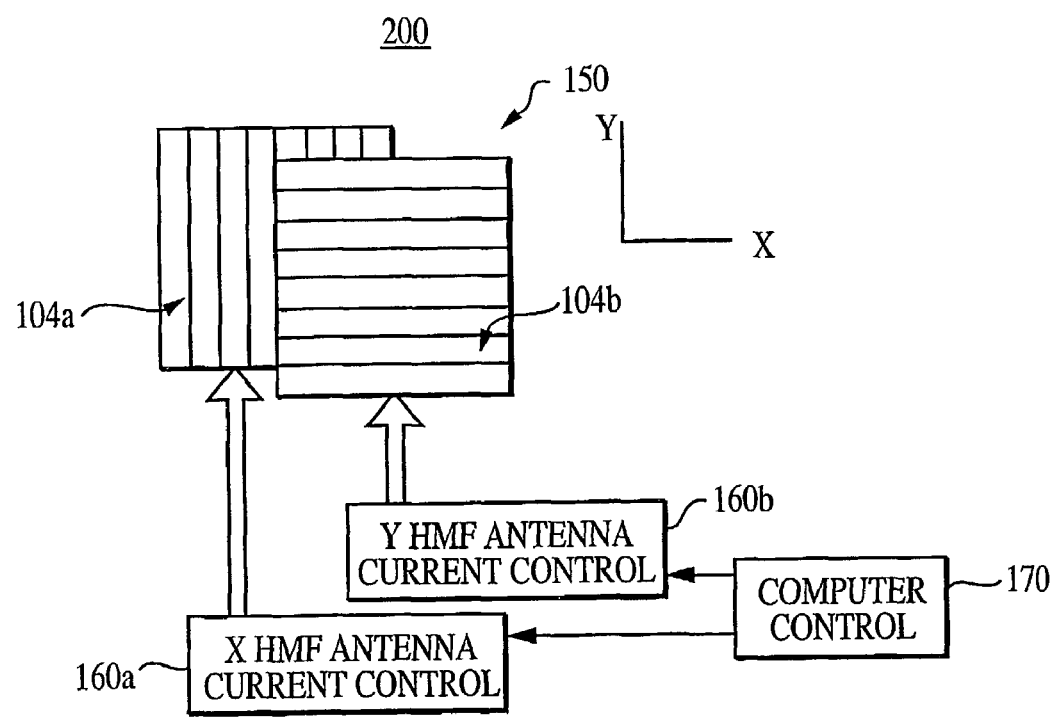
FIG. 17 is a diagram illustrating a steerable magnetic field sensor system having the two-dimensional HMF antenna.

With reference to FIGS. 16 and 17, there are shown two HMF antennas 104a, 104b at right angles to each other forming a two-dimensional HMF antenna 150 that can generate a horizontal magnetic field which can be steered in any direction in the plane of the antennas 104a, 104b, not just the direction perpendicular to the current flow in the antenna wires 102, and a diagram of a steerable HMF sensor system 200 having the two-dimensional HMF antenna 150, respectively. FIG. 16 shows one wire 102a representing x-direction HMF antenna 104a with current flow Ix in the x-direction and one wire 102b representing y-direction HMF antenna 104b with current flow Iy in the y-direction.

By controlling the current separately in each HMF antenna 104a, 104b using current control circuitry 160a, 160b under computer control 170 (FIG. 17), one can create a new magnetic field pointed in any direction in the plane of the HMF antennas 104a, 104b. The new magnetic field is given by $B=(Bx^2+By^2)^{1/2}$. The angle of the field is given by $\theta=\tan^{-1}[By/Bx]$. It is provided that receiver units 120 are provided adjacent each of the HMF antennas 104a, 104b as described above with reference to FIGS. 8 and 12A–15B.

One skilled in the art would appreciate that additional HMF antennas 104 may be provided to the system 200.

Figure 18:
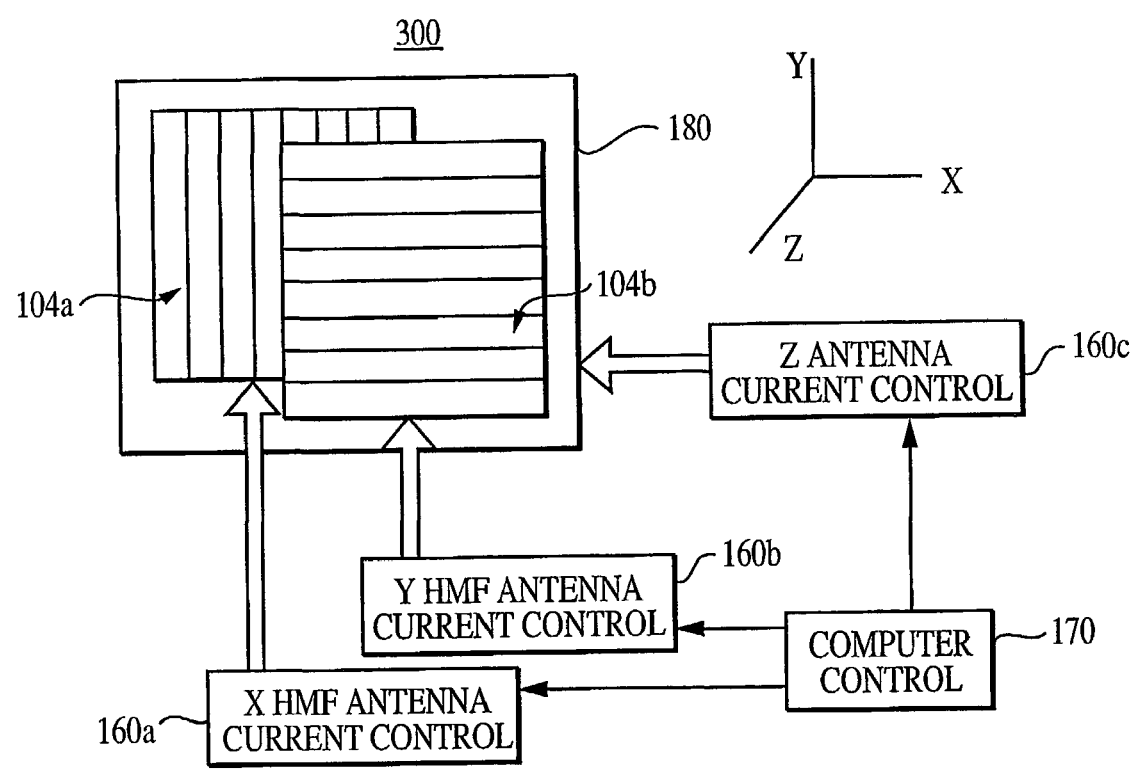
FIG. 18 is a diagram illustrating a steerable magnetic field sensor system having the three-dimensional HMF antenna.

FIG. 18 is a schematic diagram of the steerable 3-D magnetic field sensor system 300 according to the present invention. The sensor system 300 adds to the 2-D steerable HMF sensor system 150 a vertical loop antenna 180 which adds the third dimension to the steerable magnetic field sensor system. Accordingly, the generated magnetic field of the sensor system 300 is a summation of the magnetic field in the x-axis direction generated by the HMF antenna 104a, the magnetic field in the y-axis direction generated by the HMF antenna 104b, and the magnetic field in the z-axis direction generated by the vertical loop antenna 180.

At least one vertical magnetic field receiver (not shown) is understood to be included in the sensor system 300. A z-antenna current control circuitry 160c is also provided which is under computer control 170 for controlling the magnetic field in the z-direction.

It is contemplated to provide a computer data collection system to the sensor system 100 for digitizing the time decay data from the output of the receivers 120. The data would then be analyzed to optimize the system's operating parameters, such as antenna current, digitizer sample rate and time sampling window, for optimal target data collection and characterization. Once a target's time decay response is measured, the target can then be classified and identified using a matched filter or other classification/identification approach. It is further contemplated to configure the steerable magnetic field sensor system 100 for mounting to a vehicle or aircraft to provide a vehicle mounted or airborne mine detector sensor system.

It is further contemplated to configure the HMF antenna 104, the steerable 2-D or 3-D magnetic field sensor systems for mounting to a vehicle to provide a vehicle mounted mine/UXO detector sensor system; for detection, localization and identification of buried utilities; and for detection and identification of hidden targets at critical points of entry, such as airports and secured areas. The antenna and systems configured could also be for mounting to an aircraft or other airborne platform for airborne active electromagnetic surveys for mines, and buried ordnance and utilities.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

The invention claimed is:

1. A sensor system for inducing eddy currents in objects comprising:
an antenna configured for generating a magnetic field in a direction perpendicular to current flow in a plurality of wires along a plane of the antenna;
at least two receiver units in proximity to the plane of the antenna, each of said two receiver units configured for converting the eddy currents into a first signal and a second signal; and
an amplifier for receiving the first and second signals.

2. The system according to claim 1, wherein the antenna has a rectangular configuration having a length of approximately 180 cm and a width of approximately 80 cm.

3. The system according to claim 1, wherein adjacent wires of the plurality of wires along the plane of the antenna are equally-spaced and parallel with respect to each other.

4. The system according to claim 1, wherein the amplifier subtracts the first signal from the second signal.

5. The system according to claim 1, wherein each of that at least two receiver units measures approximately 15×15 cm and has 16 loop turns.

6. The system according to claim 1, wherein the at least two receiver units are provided above the plane of the antenna.

7. The system according to claim 1, wherein the at least two receiver units are provided below the plane of the antenna.

8. The system according to claim 1, where one of the at least two receiver units is placed below the plane of the antenna and the other of the at least two receiver units is placed above the plane of the antenna.

9. The system according to claim 1, wherein the amplifier adds the first signal and the second signal.

10. The system according to claim 1, wherein each of the wires along the plane of the antenna is twisted with an adjacent wire and both wires are connected by at least one damping resistor.

11. The system according to claim 1, further comprising another antenna oriented at approximately 90 degrees with respect to the antenna for generating another magnetic field in a direction perpendicular to the current flow in a plurality of wires along its plane.

12. The system according to claim 11, further comprising current control circuitry for controlling the direction of a pulsed magnetic field which is a summation of the magnetic fields generated by the two antennas.

13. The system according to claim 11, further comprising an antenna encircling the two antennas for generating another magnetic field.

14. The system according to claim 13, further comprising current control circuitry for controlling the direction of a pulsed magnetic field which is a summation of the magnetic fields generated by the three antennas.

15. A sensor system for inducing eddy currents in objects comprising:
an antenna configured for generating a pulsed magnetic field in a direction perpendicular to current flow in a plurality of wires along a plane of the antenna;
at least two receiver units in proximity to the plane of the antenna , each of said two receiver units configured for converting the eddy currents into a first signal and a second signal; and
an amplifier for receiving the first and second signals;
wherein the antenna includes a first bank and a second bank of switches, the first bank of switches is at one end of the antenna and the second bank of is at an opposite end of the antenna, and the first bank of switches and the second bank of switches are connected by a plurality of return wire loops and the plurality of wires along the plane of the antenna.

16. The system according to claim 15, wherein the first bank and the second bank of switches are controlled by pulse control circuitry.

17. The system according to claim 15, wherein each of the plurality of return wire loops includes a wire segment perpendicular to the equally-spaced parallel wires.

18. The system according to claim 15, wherein the first bank and the second bank of switches each include 16 switches.

19. The system according to claim 18, wherein four equally-spaced parallel wires of the plurality of wires couple each of the switches of the first bank of switches with a respective switch of the second bank of switches.

20. The system according to claim 15, wherein each of the plurality of return wire loops include two wires connected by at least one damping resistor, and wherein each of the plurality of return wire loops include a twisted portion.

21. A sensor system comprising:
first, second and third antennas configured for generating respective magnetic fields in three directions perpendicular to each other;
wherein the first antenna has a plurality of wires along a plane thereof for generating a magnetic field in a first direction perpendicular to the current flow in the plurality of wires; and
control circuitry configured to control the generation of a pulsed magnetic field to produce a magnetic field in selected ones of said three directions, including to selectively produce a magnetic field in the direction perpendicular to the current flow in the plurality of wires;
wherein the first antenna includes a first bank and a second bank of switches, the first bank of switches is at one end of the first antenna and the second bank of switches is at an opposite end of the first antenna, and the first bank of switches and the second bank of switches are connected by a plurality of return wire loops and the plurality of wires.

22. The system according to claim 21, wherein the plurality of return wire loops include two wires connected by at least one damping resistor, and wherein each of the plurality of return wire loops include a twisted portion.

23. An antenna system for introducing eddy currents in objects comprising:
a first antenna configured for generating a pulsed magnetic field in the x-axis direction;
a second antenna configured for generating a pulsed magnetic field in the y-axis direction and oriented at a 90-degree angle with respect to the first antenna; and
a third antenna configured for generating a pulsed magnetic field in the z-axis direction and encircling the first and second antennas.

24. The system according to claim 23, further comprising current control circuitry for controlling the direction of a pulsed magnetic field which is a summation of the pulsed magnetic field in the x-axis direction, the pulsed magnetic field in the y-axis direction, and the pulsed magnetic field in the z-axis direction.

25. The system according to claim 23, wherein the first and second antennas include a plurality of wires, and wherein adjacent wires are connected to each other by at least one damping resistor.

26. A sensor system comprising:
first, second and third antennas configured for generating respective pulsed magnetic fields in three directions perpendicular to each other;
wherein the first antenna has a plurality of wires along a plane thereof for generating a pulsed magnetic field in a first direction perpendicular to the current flow in the plurality of wires; and
control circuitry configured to control the generation of a pulsed magnetic field to produce a pulsed magnetic field in selected ones of said three directions, including to selectively produce a pulsed magnetic field in the direction perpendicular to the current flow in the plurality of wires.

27. The system according to claim 26, wherein the plurality of wires are equally-spaced with respect to each other.

28. The system according to claim 26, wherein each of the plurality of wires is twisted with an adjacent wire and both wires are connected by at least one damping resistor.

29. The system according to claim 26, wherein the antenna includes a first antenna and a second antenna oriented at approximately 90 degrees with respect to each other, and wherein the pulsed magnetic field is a summation of a magnetic field generated by the first antenna and a magnetic field generated by the second antenna.

30. The system according to claim 29, wherein the antenna includes a third antenna encircling the first and second antennas, and wherein the pulsed magnetic field is a summation of the pulsed magnetic field generated by the first antenna, the magnetic field generated by the second antenna, and a pulsed magnetic field generated by the third antenna.

* * * * *

UNITED STATES PATENT AND TRADEMARK OFFICE
CERTIFICATE OF CORRECTION

PATENT NO. : 7,030,759 B2  Page 1 of 1
APPLICATION NO. : 10/182519
DATED : April 18, 2006
INVENTOR(S) : Carl V. Nelson It is certified that error appears in the above-identified patent and that said Letters Patent is hereby corrected as shown below:

In Column 14 -
Line 9, delete "that" and substitute therefor --the--
Line 35, delete "pulsed"
Line 42, delete "pulsed"
Line 46, delete "pulsed"
Line 56, insert --switched-- after "of" and before "is"

In Column 15 -
Line 21, delete "pulsed"
Line 37, delete "introducing" and substitute therefor --inducing--

In Column 16 -
Line 31, replace entire line with --first antenna and the second antenna are--
Line 34, insert --pulsed-- after "a" and before "magnetic"
Line 35, insert --pulsed-- before "magnetic"
Line 36, insert --third-- after "the"
Line 37, delete "includes a third antenna encircling" and substitute therefor --encircles--
Line 40, insert --pulsed-- after "the" and before "magnetic"

Signed and Sealed this

Fourteenth Day of November, 2006

JON W. DUDAS
*Director of the United States Patent and Trademark Office*